United States Patent [19]

Yang et al.

[11] Patent Number: 5,546,543
[45] Date of Patent: Aug. 13, 1996

[54] METHOD FOR ASSIGNING PRIORITY TO RECEIVE AND TRANSMIT REQUESTS IN RESPONSE TO OCCUPANCY OF RECEIVE AND TRANSMIT BUFFERS WHEN TRANSMISSION AND RECEPTION ARE IN PROGRESS

[75] Inventors: Henry S. Yang, Andover; Kadangode K. Ramakrishnan, Maynard, both of Mass.; Gady Daniely; Aviad Wertheimer, both of Jerusalem, Israel

[73] Assignee: Digital Equipment Corporation, Maynard, Mass.

[21] Appl. No.: 37,287

[22] Filed: Mar. 26, 1993

[51] Int. Cl.⁶ .................................................... G06F 13/14
[52] U.S. Cl. ...................... 395/250; 395/841; 395/849; 395/860; 364/239; 364/239.6; 364/239.7; 364/DIG. 1
[58] Field of Search .................................... 395/250, 275, 395/425, 841, 849, 860; 370/94.1, 95.1, 97

[56] References Cited

U.S. PATENT DOCUMENTS

| | | | |
|---|---|---|---|
| 4,727,538 | 2/1988 | Furchtgott et al. | 370/85 |
| 4,866,597 | 9/1989 | Kinoshita | 364/200 |
| 4,866,702 | 9/1989 | Shimizu et al. | 370/60 |
| 4,910,507 | 3/1990 | Shimizu et al. | 370/94.1 |
| 5,255,371 | 10/1993 | Latimer et al. | 395/250 |
| 5,276,681 | 1/1994 | Tabagi et al. | 370/85.4 |
| 5,295,246 | 3/1994 | Bischaff et al. | 395/250 |
| 5,301,274 | 4/1994 | Li | 395/250 |
| 5,377,184 | 12/1994 | Beal et al. | 370/24 |
| 5,440,691 | 8/1995 | Carrafiello et al. | 395/250 |

FOREIGN PATENT DOCUMENTS

| | | |
|---|---|---|
| 0432978 | 6/1991 | European Pat. Off. . |
| 0525860 | 2/1993 | European Pat. Off. . |

*Primary Examiner*—Thomas C. Lee
*Assistant Examiner*—Moustafa M. Meky
*Attorney, Agent, or Firm*—Kenneth F. Kozik

[57] ABSTRACT

An arbiter of an I/O controller implements an arbitration process for controlling bi-directional data flow between a local area network and a main memory connected to a system bus having variable latency. A receive state machine of the controller manages inbound data bursts from the network by temporarily storing the data in a receive buffer before transfer to the main memory. Outbound data bursts from the main memory are managed by a transmit state machine of the controller, and are temporarily stored in a transmit buffer prior to transmission onto the network. The arbitration process assigns each of the receive and transmit state machines priority for accessing the system bus depending upon certain status conditions of the controller. These conditions include: (i) whether one or both of the state machines are contending for access to the system bus; (ii) whether the controller is configured for full-duplex or half-duplex communication over the network; (iii) the current status of the transmit and receive network ports; and (iv) the current state of the receive and transmit buffers.

17 Claims, 5 Drawing Sheets

METHOD FOR ASSIGNING PRIORITY TO RECEIVE AND TRANSMIT REQUESTS IN RESPONSE TO OCCUPANCY OF RECEIVE AND TRANSMIT BUFFERS WHEN TRANSMISSION AND RECEPTION ARE IN PROGRESS

FIELD OF THE INVENTION

This invention relates generally to the transfer of data through an I/O controller of a computer system and, more particularly, to an arbitration process for accessing a shared resource of the computer to enable bi-directional data flow through the I/O controller.

BACKGROUND OF THE INVENTION

An I/O controller, such as a disk controller or a network controller, typically moves data between a disk subsystem or a network subsystem, and other units of a computer system. When inbound data is received from the subsystem, the controller typically transfers the data to a main memory unit, to await further processing. The memory unit may be connected to a system bus, which is shared by other units of the computer connected thereto. Outbound data, retrieved from the memory unit, are subsequently transferred by the controller to the subsystem. A DMA function located on the controller directs the movement of data through the controller. Within the DMA function, there is typically a set of data paths and a control function, the latter often being implemented by a state machine. The data paths and the state machine may also be shared between the inbound and outbound data transfers. Consequently, the main memory, the system bus and the DMA function may be considered shared resources requiring arbitration to gain access to effectuate data transfers in different directions.

The controller is typically configured for half-duplex communication with the subsystem, i.e., it is capable of either transmitting and receiving data at any given time, but not simultaneously. However, the controller can be configured for full-duplex communication to transmit outbound data and receive inbound data at the same time. For either type of communication, the controller must be capable of transmitting and receiving "blocks" of data to and from the subsystem. A block of data may represent a fixed group of data for the disk or a fixed packet of data for the network.

Inbound data received from the subsystem are moved through the controller and onto the system bus in accordance with direct memory access (DMA) transfers on the bus. A DMA transfer typically involves (i) a request for access to a shared resource followed by a subsequent grant of access, and (ii) a "burst" of data of a predetermined size. Because it may be busy performing operations with other units of the computer system, the shared resource is not always immediately available for use. The time between when a request is issued to access the shared resource and when access to that resource is granted constitutes "latency" of the resource. Typically, this latency varies from system to system, depending upon the characteristics of the resource, e.g., the throughput of the system bus and the number of units connected to the bus.

A known solution to the variable latency problem is to provide a buffer memory in the controller, i.e., between the subsystem and the system bus. Because of cost and design constraints, the size of the buffer memory is typically small. For example, when implementing an Ethernet controller in a single chip, the size of the buffer memory may be between 48–256 bytes. The buffer can continue to receive data from the subsystem when access to the shared resource has yet to be granted. When access to the resource is subsequently granted, the controller can then transfer a burst of data from the buffer. There is, of course, the possibility of a buffer overflow condition, when access to the shared resource is not granted for an interval long enough that the buffer becomes completely filled.

A similar problem is presented during transfer of outbound data to the subsystem. Once access to the subsystem is granted, a block of data, e.g., a packet, must be transferred at a predetermined rate to the disk subsystem or the network subsystem. Another buffer memory in the transmit path of the controller stores at least a limited amount of data so that a steady stream of outbound data may continue when access to the shared resource has not been granted. In this case, there is the possibility of buffer underflow, when the buffer is completely emptied by the need to transmit data at a fixed rate for the duration of the data block and the shared resource cannot be accessed.

One conventional simple policy for managing these buffers ensures reception of data from the subsystems at the expense of data transmission thereto. In other words, if a receive operation is in progress, priority is given to the completion of that operation, i.e., reception of a complete block of data at the controller, before any attention is given to possible transmit operations. Moreover, if another incoming block is recognized before the transmit operation begins, the latter operation may be aborted. The receive operations can thus completely monopolize the controller and transmit operations may be delayed indefinitely, resulting in "transmission starvation".

Another conventional policy merely alternates between transmit and receive operations, without regard as to the status conditions of the shared resource and the buffers. For example, transmission to a subsystem may be initiated even though the shared resource cannot be accessed and there is an insufficient amount of data stored in the buffer to transmit data at the required steady rate for the duration of the data block. The resulting buffer underflow situation degrades the performance of transmission of packets because only fragments of the packet can be transmitted to the subsystem. Similarly, an overflow from the buffer receiving data from the subsystem may be more frequent when a simple alternating policy is used.

Each of these arrangements suffers from the disadvantage that the controller cannot tolerate a relatively long latency and low throughput of the shared resource compared with the data transfer rate of the controller. Consequently, the controller or the system is designed to meet tight timing requirements for accessing the resource. Such restrictions also increase the cost and complexity of the system, while limiting the number of the controllers that may be employed in the system.

It is therefore apparent that there exists a need for enabling efficient access to the shared resource while managing the buffers for data transfer through the controller.

SUMMARY OF THE INVENTION

The present invention resides in a novel arbitration process for accessing a shared resource, such as a system bus, to enable bi-directional data flow through an I/O controller connected to a subsystem, such as local area network, and a main memory unit connected to the system bus. The controller includes a receive state machine for managing inbound data from the network and a transmit state machine for managing outbound data from the main memory. An arbiter of the controller implements the arbitration process in granting the respective state machines access to the system bus.

The receive state machine manages an inbound packet of data from the network by temporarily storing the data in a receive buffer. Once access to the system bus has been obtained, the inbound data is transferred as a series of individual bursts to the main memory over the system bus. Outbound data bursts from the main memory are temporarily stored in the transmit buffer and subsequently transmitted onto the network as a packet.

The arbitration process assigns each of the state machines priority for access to the system bus depending upon certain status conditions, i.e., inquiries of the controller. This arrangment ensures that the state machines share the system bus, in an efficient manner, to perform their respective functions of initiating an inbound data burst, i.e., a transfer on the system bus, to the main memory when a packet is received from the network, and initiating an outbound data transfer from the memory when a packet is transmitted to the network. The status inquiries include: (i) whether one or both of the state machines are contending for access to the system bus; (ii) whether the controller is configured for full-duplex or half-duplex communication over the network; (iii) the current status of the transmit and receive network ports of the controller; and (iv) the current states of the receive and transmit buffers.

Arbitration, as described herein, is performed for each transfer on the system bus. In addition, if two packets are consecutively received from (or transmitted to) the network by the controller, the arbitration process in accordance with the invention assigns the transmit state machine (or receive state machine) priority to access the system bus for one transfer intervenient to the consecutive packets. It should be noted that the amount of data transported during a transfer on the system bus, e.g., 64 bytes, is much less than the amount of data transported in a packet on the network, e.g., 1500 bytes. This arrangement increases efficiency of data flow through the controller by minimizing both overflow of the receive buffer during a receive operation and underflow of the transmit buffer during a transmit operation, while preventing transmission starvation.

Specifically, when either the transmit state machine or receive state machine requests access to the system bus, the requesting state machine is granted access to the bus. When the receive and transmit state machines are both contending for access to the system bus, the mode of communication, i.e., half-duplex or full-duplex, determines what action is taken.

For half-duplex communications, if a transmission is not in progress on the network port, priority is given to the receive state machine for initiating inbound data transfers from the receive buffer to the main memory. If transmission is currently in progress on the network port, then the state machines arbitrate for the system bus based on the current occupancy of the transmit and receive buffers.

For full-duplex communications, when only transmission is in progress, priority is given to the transmit state machine for supplying output data from the main memory to the transmit buffer. When only reception is in progress, priority is given to transferring inbound data from the receive buffer. When neither transmission to nor reception on the network is in progress, yet there is sufficient data in the receive buffer to be moved into main memory and there is data in main memory to be transferred into the transmit buffer (and there is sufficient space in the transmit buffer for this latter data), access to the system bus is determined by a "round-robin" scheduling technique that alternates between the state machines depending upon the last transfer on the system bus. When requests for both transmission to and reception from the network are pending, the state machines arbitrate for the system bus based, once again, on the current occupancy of their respective buffers.

Current occupancy of the transmit and receive buffers involves a determination of whether predetermined occupancy criteria are met for the respective buffers. For the receive buffer, the inquiry is whether the number of empty data byte locations is greater than a first threshold level and, for the transmit buffer, the investigation concerns whether the amount of data resident in the transmit buffer is greater than a second threshold level. When the occupancy criterion for one of these buffers is satisfied and the other is not, the state machine associated with the latter buffer is granted priority to the system bus for both the half-duplex and full-duplex communication modes. As for the remaining combinations, priority is given to the transmit state machine when the controller is configured for half-duplex communication and the round-robin scheduling technique is utilized for full-duplex operation.

An advantage of the invention is that the arbitration method and apparatus of the invention increases the efficiency of data flow through the controller by minimizing overflow of the receive buffer and underflow of the transmit buffer. This minimizes packet loss, even under transient conditions of relatively long system bus latency.

The arbitration arrangement also minimizes the probability of transmission starvation under a heavy load of reception operations from the network without increasing the latency for delivering a received packet to main memory.

Another advantage is that a system having controllers designed in accordance with the invention can support many such controllers coupled to a system bus. The system design can, in turn, be more relaxed in terms of latency for access to the shared resource.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
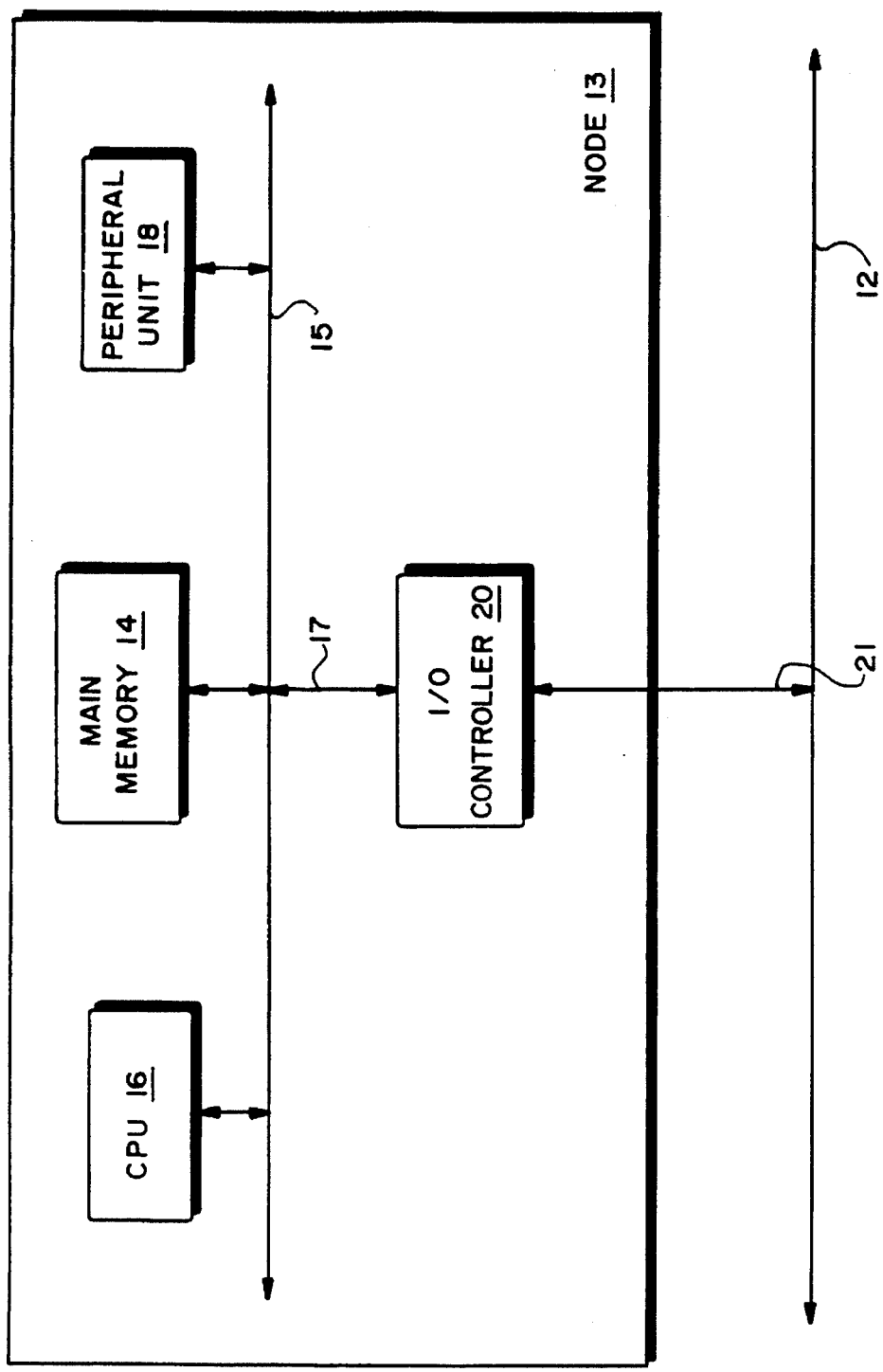
FIG. 1 is a block diagram illustrating a local area network connected through an I/O controller to a system bus having variable latency.

FIG. 1 illustrates a subsystem, such as a local area network 12, connected to a node 13 that includes an I/O controller 20, a main memory 14, a central processing unit (CPU) 16 and other peripheral units 18, such as terminals, all of which are interconnected by a system bus 15. In an alternate embodiment of the invention, the subsystem may embody mass storage units such as a disk subsystem.

For the embodiment of FIG. 1, the controller 20 connects to the system bus 15 through a bi-directional path 17, and connects to the network subsystem 12 through a bi-directional path 21. The network subsystem typically embodies a bus topology to accomodate high-bandwidth, half-duplex data communication among controllers of other nodes connected thereto. However, the controller 20 may also be configured to provide full-duplex communication between the nodes coupled to the network.

During a receive operation, data is transferred from the network 12 into the controller 20 and is eventually transferred to the main memory 14 to await processing. Data transfer between the controller 20 and the main memory 14 is performed in accordance with a direct memory access (DMA) transfer on the system bus 15. A DMA transfer involves a request for access to the system bus followed by a subsequent grant of access and a "burst" of data of a predetermined size. During a transmit operation, data retrieved from the main memory 14 is transferred from the controller 20 to the network 12. Transfers of data between the network 12 and the controller 20 are at a fixed rate on an individual packet basis.

In the system of FIG. 1, and in most typical systems, the system bus 15 is not always immediately available for access by the controller 20 to perform read and write transfers in the main memory 14. The bus 15 may be busy performing other operations involving other units connected to it, or another unit may be performing a read or write memory transfer. Consequently, the system bus 15 is considered a shared resource of the system (as is the main memory), and the time between when a request is issued to access the system bus 15 and when access to the bus is granted constitutes "latency" of the system bus 15.

Figure 2:
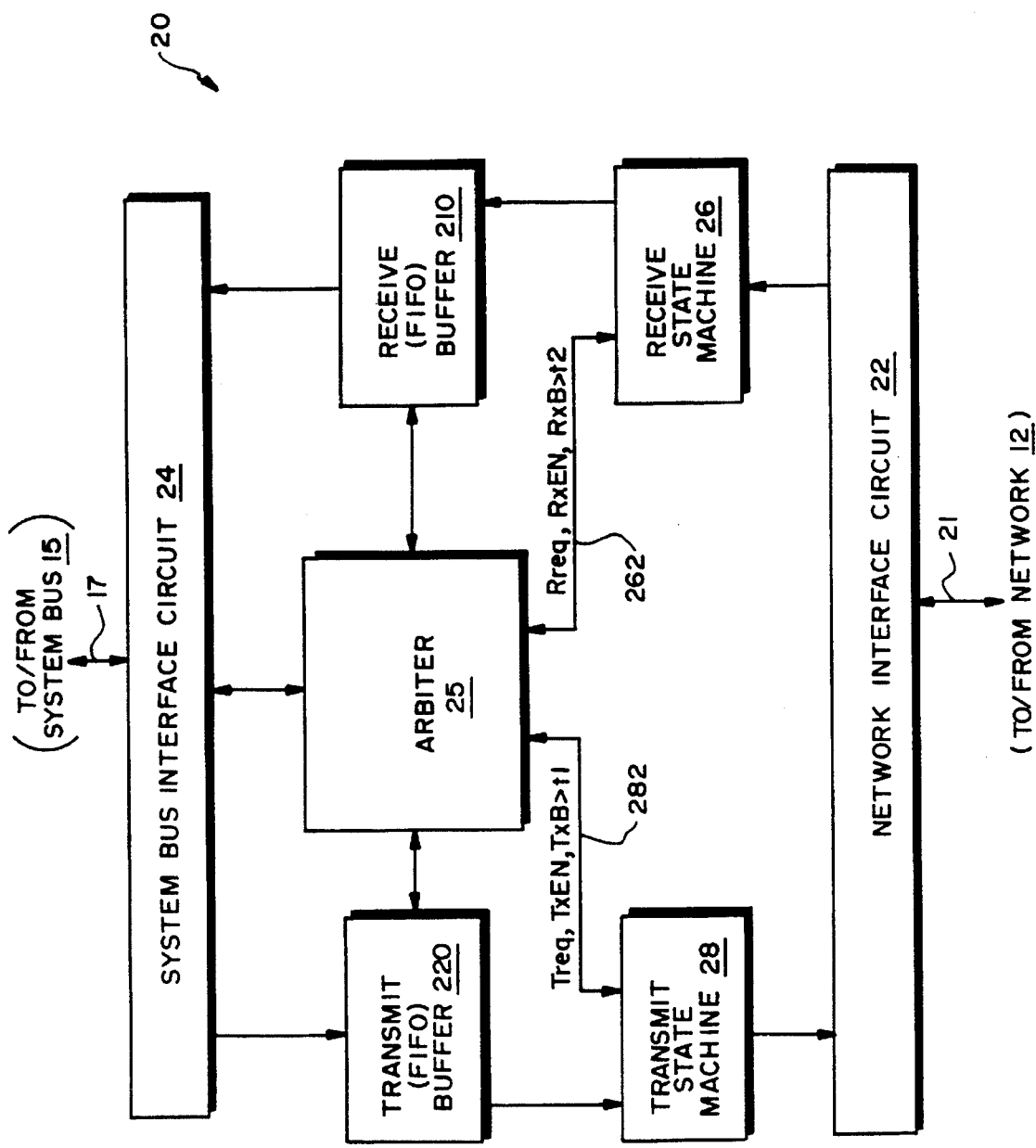
FIG. 2 is a block diagram of the controller of FIG. 1.

To accomodate the bus latency, the controller 20, shown in FIG. 2, includes two FIFO ("first-in-first-out") buffer memories. Data entering the controller 20 over line 21 from the network 12 passes through a network interface circuit 22 and a receive state machine 26, and then into a receive FIFO buffer memory ("receive buffer 210") for temporary storage until the controller gains access to the system bus 15 to perform a write transfer in the memory 14. Thereafter, the data passes through a system bus interface circuit 24 and onto the system bus 15, and is written to main memory 14. Data to be transmitted is read from the main memory 14 upon access to the system bus by the controller 20. The outbound data passes through the interface circuit 24 and into a transmit FIFO buffer memory ("transmit buffer 220"). When the controller gains access to the network 12, the data passes through a transmit state machine 28 and the network interface circuit 22 and onto the network 12.

The network interface circuit 22 may be a conventional interface circuit that incorporates the signal, electrical and mechanical characteristics, and interchange circuits, needed to interface with the network 12. The system bus interface circuit 24 contains the data path logic and physical connections needed to ensure that the node 13 meets the timing and electrical characteristics required to communicate on the system bus 15.

Bi-directional data flow through the controller 20 is controlled by an arbiter 25 that grants the state machines access to the system bus 15 in accordance with an arbitration process described below. As with the receive and transmit state machines 26,28, the arbiter 25 preferably comprises registers and combinational logic configured as a sequential logic circuit. The state machines direct the bi-directional flow of data between the network and the system bus through the buffers of the controller.

Specifically, the transmit state machine initiates transfer of outbound data bursts from the main memory 14 with a read transfer on the system bus 15. These outbound data bursts are temporarily stored in the transmit buffer 220 and subsequently transmitted onto the network 12. The receive state machine manages inbound data bursts from the network and temporarily stores the data in the receive buffer 210. An example of a function performed by the state machines is the conversion of a serial bit stream of data to/from the network into bytes after/prior to storing the data in the buffers.

Upon satisfying a predetermined threshold level of data received in the receive buffer 210 and upon gaining access to the system bus 15, the receive state machine initiates transfer of a burst of inbound data, having a predetermined size, to the main memory 14 as a write transfer on the system bus 15. The size of a burst of data may vary depending upon the system bus characteristics. However, the amount of data transferred during a burst on the system bus is typically much less than the block of data transferred, e.g., in a packet, on the network. As will be described herein, the state machines must arbitrate for access to the system bus for each transfer of a single burst of data on the bus.

An objective of the controller 20 is to control bi-directional data flow between the system bus and the network in such a manner as to avoid or minimize loss of data. Data loss in a network environment is not necessarily fatal, and, in fact, some loss is anticipated despite trying to avoid any loss. Most messages transmitted on the network require acknowledgment, and recovery can usually be effected by repeating the message until it is received without error. However, it is desirable to minimize the use of system resources involved in message retransmission. A packet of data will be corrupted if the transmit buffer 220 is emptied before the entire message has been retrieved from the memory 14. This is called an underflow condition. For flow in the receive direction, data will be lost if the receive buffer 210 cannot be emptied into the main memory 14 fast enough to accomodate the incoming flow of data from the network 12. This is called an overflow condition. To keep up with data received from the network 12, the controller 20 performs write transfers to the main memory 14 at a rate determined by the latency of the system bus, the size of the bursts of data written into the memory once access to the bus has been granted and by the data rate of the network 12.

In accordance with the invention, bi-directional data flow is controlled dynamically by the arbiter 25 according to an arbitration process that schedules transmit and receive state machine requests so that the most critical request is granted access to the system bus 15. The requests are assigned different priorities depending upon certain status conditions, i.e., inquiries, of the controller 20. These inquiries include: (i) whether one or both of the state machines are contending for access to the system bus 15; (ii) whether the controller is configured for full-duplex or half-duplex communication over the network; (iii) the current status of the transmit and receive network ports; and (iv) the current state of the receive and transmit buffers. The arbiter 25 is supplied with this information through various signals conveyed from the state machines. These signals (set forth below as asserted) include:

o Treq: a request for the system bus, over line 282, by the transmit state machine to transmit data;

o Rreq: a request for the system bus, over line 262, by the receive state machine to receive data;

o TxEN: an indication, over line 282, that the controller is currently transmitting data onto the network;

o RxEN: an indication, over line 262, that the controller is currently receiving data from the network;

o RxB>t1: an indication, over line 262, that the number of free byte locations in the receive buffer is greater than a first predetermined threshold level; and o TxB>t2: an indication, over line 282, that the amount of data in the transmit buffer is greater than a second predetermined threshold level.

It should be noted that the first and second threshold levels t1, t2 need not be of the same value and are, in fact, typically different. For example, in an exemplary embodiment of the invention, t1 may be approximately 170 bytes and t2 may be 72, 96, 128 or 160 bytes.

Figure 3A:
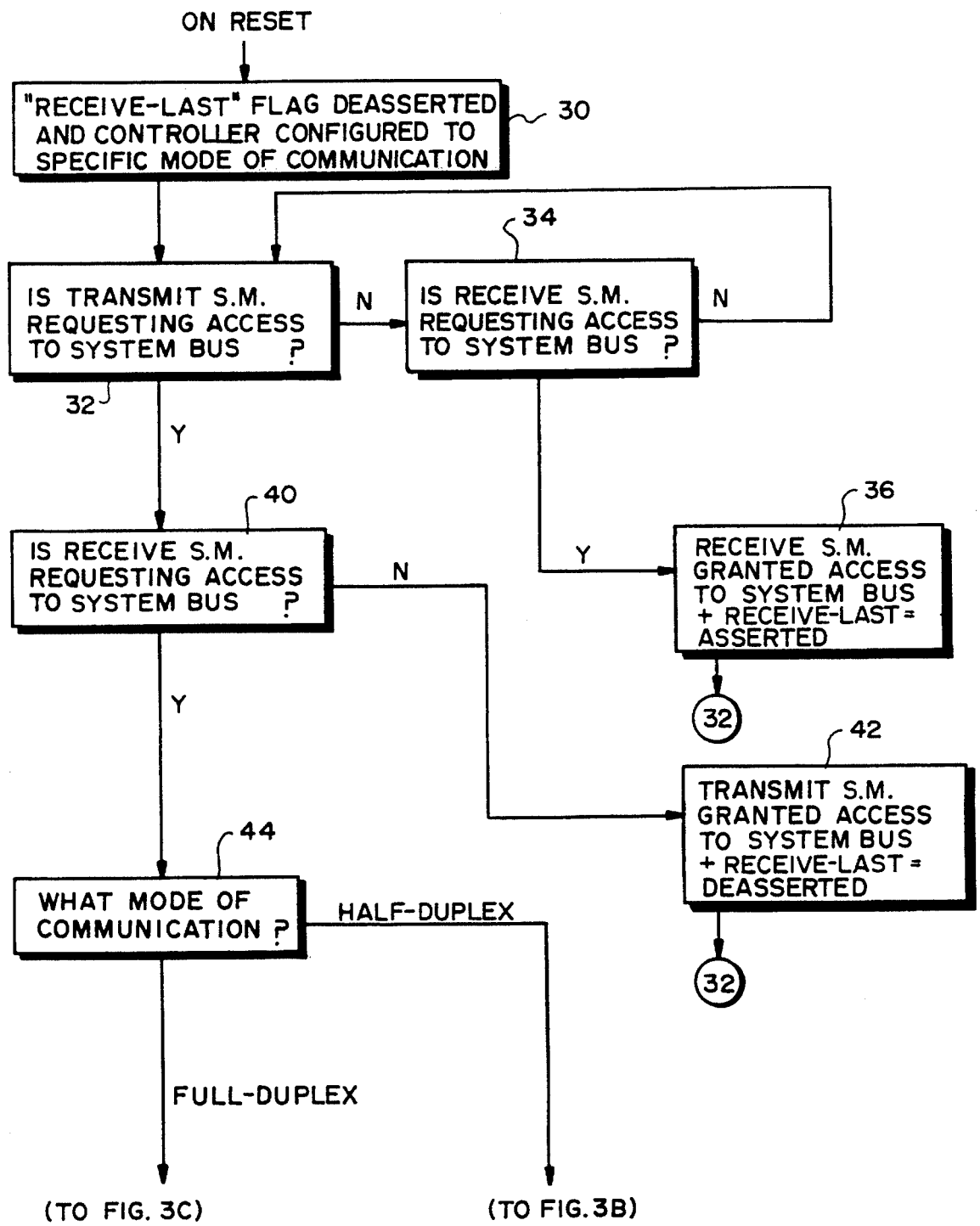
FIGS. 3A–C are flowcharts detailing the arbitration process performed by the controller in accordance with the invention.
Figure 3B:
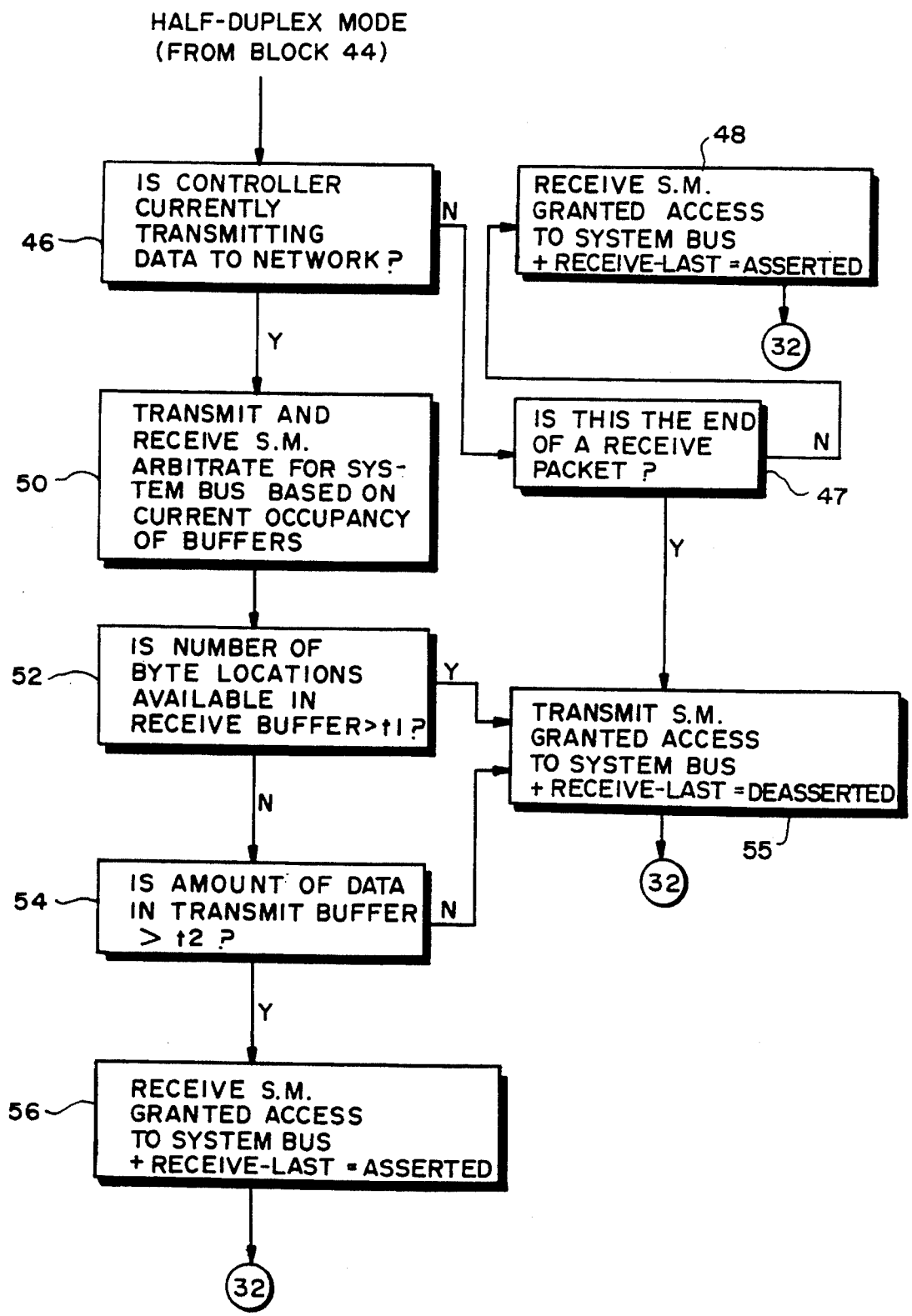
Figure 3C:
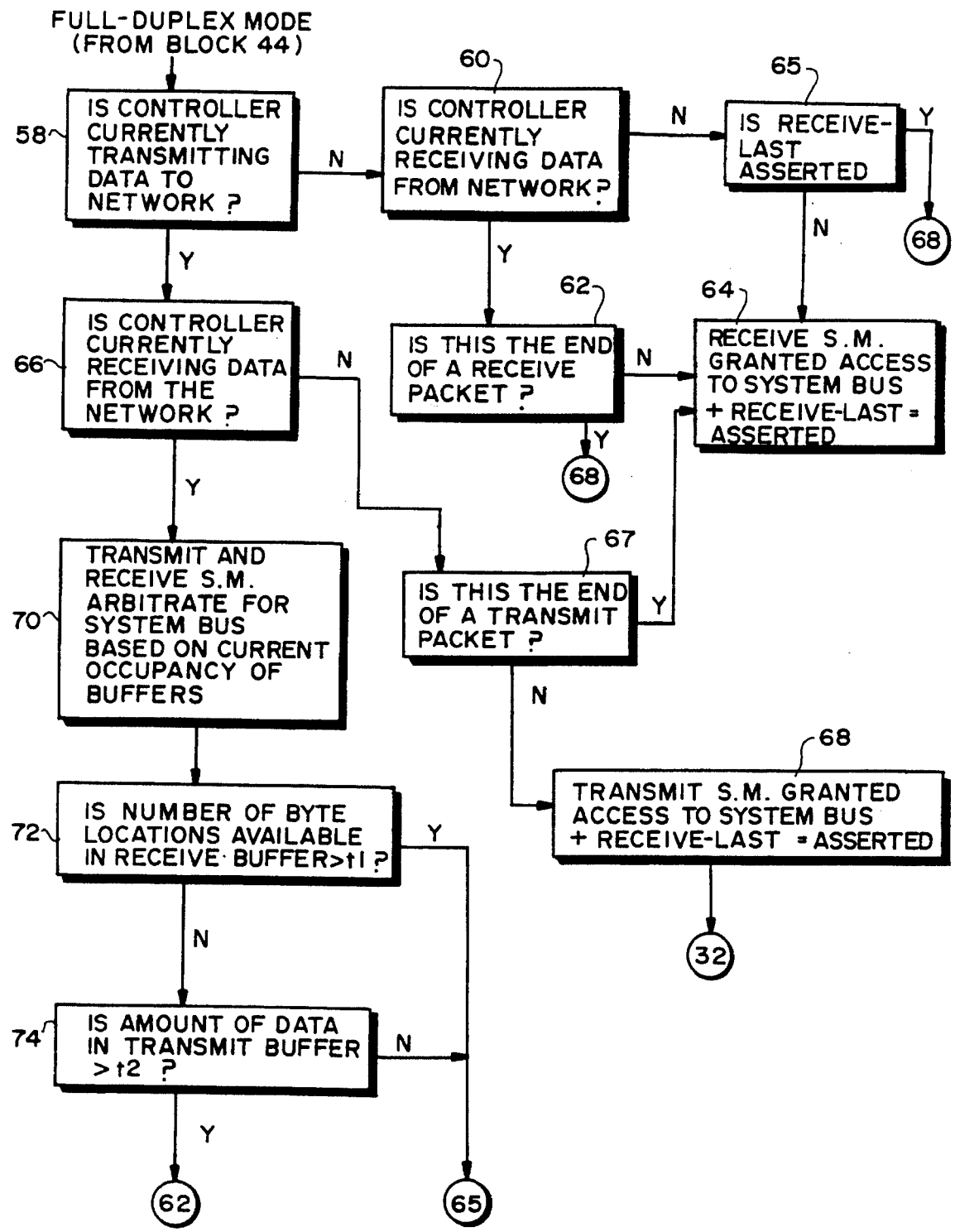

The arbitration process employed by the controller 20 in accordance with the invention may be better understood from the flowcharts of FIGS. 3A–3C. Referring to FIG. 3A, the arbiter 25 includes a "receive-last" flag that it maintains, i.e., asserts or deasserts, as a means for determining which state machine was last granted access to the system bus to initiate a transfer operation. Upon initialization of the controller, the receive-last flag is deasserted and the controller is configured for a specific mode of communication, i.e., full-duplex or half-duplex, via a hardware or software switch. (Block 30.) The arbiter 25 then determines whether the transmit state machine is requesting access to the system bus 15. (Block 32.) If not, the receive state machine is examined to see if it is requesting access to the bus. (Block 34.) If the receive state machine has a request pending, it is granted priority to access the system bus for a single transfer on the bus and the receive-last flag is asserted (Block 36); thereafter, the arbiter repeats the above inquiry. (Block 32.) If the receive state machine is not requesting the bus, the arbiter repeats the above inquiry. (Block 32.)

If, this time, the transmit state machine is requesting access to the system bus (Block 32), then the status of the receive state machine is examined (Block 40) and, if it is not requesting the bus, the transmit state machine is granted priority for the transfer of one data burst on the system bus and the receive-last flag is deasserted (Block 42); again, the arbiter repeats the above inquiry. (Block 32.) If both state machines are contending for the bus, then the mode of communication determines what action is taken. (Block 44.)

If the controller is configured for half-duplex communication (FIG. 3B), the arbiter 25 first determines whether the controller is currently transmitting data packets to the network. (Block 46.) If transmission is not in progress, the arbiter determines whether the received data is for the end of a receive packet. (Block 47.) The "end-of-a-packet" is typically detected by an operation that, e.g., exchanges information between the controller and the shared resource, indicating that the end of a packet has been reached. Because such operations are generally well-known in the art, details of a specific end-of-a-packet detection operation will not be described herein.

If the received data is not for the end of a receive packet, priority is given to the receive state machine for transferring inbound data as a burst on the system bus from the receive buffer and the receive-last flag is asserted. (Block 48.) If the end of a receive packet has been reached, subsequent to completion of the current receive request, the transmit state machine is granted access to the bus for one transfer and the receive-last flag is deasserted. (Block 55.) It should be noted that the end-of-a-packet inquiry is true once for each packet received from (or transmitted to) the network; when returning to Block 32 at this occurence, the transmit (or receive) state machine is granted access to the system bus for one burst of data during a bus transfer that is intervenient to the reception (transmission) of consecutive packets.

If the transmission is currently in progress, then the transmit and receive state machines arbitrate for the system bus based on the current occupancy of the transmit and receive buffers. (Block 50.)

More specifically, current occupancy of the transmit and receive buffers involves a determination of whether predetermined occupancy criteria are met for the respective buffers. For the receive buffer, the inquiry is whether the number of empty data byte locations is greater than the threshold level t1. (Block 52.) If this first criterion is not satisfied, the next inquiry concerns whether the amount of data resident in the transmit buffer is greater than the threshold level t2. (Block 54.) If this criterion is met, then the receive state machine is granted priority to access the system bus and the receive-last flag is asserted. (Block 56.) Priority access to the system bus is given to the transmit state machine for all remaining combinations of the occupancy criteria and the receive-flag is deasserted. (Block 55.) Thereafter, the arbiter returns to Block 32.

If the controller is configured for full-duplex communication (FIG. 3C), the first determination made by the arbiter 25 is, again, whether the controller 20 is currently transmitting data packets onto the network 12. (Block 58.) If transmission is not in progress, but the controller is currently receiving data packets from the network (Block 60), the arbiter investigates whether the end of a receive packet has been reached. (Block 62.) If it has not, the receive state machine is granted priority to access the system bus for the next transfer on the system bus and the receive-last flag is asserted. (Block 64.) If the end of a receive packet has been reached, subsequent to completion of the current receive request, the transmit state machine is granted access to the bus and the receive-last flag is deasserted. (Block 68.)

However, if transmission is not in progress and if the receive state machine is not currently enabled (Block 60), the state machines arbitrate for the bus in accordance with a "round-robin" scheduling technique based upon the state of the receive-last flag (Block 65), i.e., if the receive-last flag is asserted, the transmit state machine is granted access to the bus (Block 68) and if the flag is deasserted, the receive state machine is granted priority to access the bus. (Block 64.) In other words, since there are only two state machines contending for the system bus in the exemplary embodiment described herein, round-robin scheduling comprises alternating priority between the machines.

If transmission is in progress (Block 58) and the controller is not currently receiving data from the network (Block 66), priority access to the bus is given to the transmit state machine for supplying output data to the transmit buffer (Block 68) if the end of a transmit packet is not reached (Block 67); otherwise, subsequent to completion of the current transmit request, the receive state machine is granted priority to the bus. (Block 64.) In either case, the receive-last flag is either deasserted or asserted, respectively.

When the controller is both transmitting data to and receiving data from the network, the state machines are currently in progress, the state machines arbitrate for the system bus based, once again, on the current occupancy of the transmit and receive buffers. (Block 70.)

Specifically, if the number of available data byte locations in the receive buffer is not greater than the threshold level t1 (Block 72) and the amount of data resident in the transmit buffer is greater than the threshold level t2 (Block 74), the arbiter 25 determines whether the end of a receive packet has been reached. (Block 62.) If so, subsequent to completion of the current receive request, the transmit state machine is granted access to the bus and the receive-last flag is deasserted (Block 68); if not, the receive state machine is granted priority to access the system bus and the receive-last flag is asserted. (Block 64.) Otherwise, for any of the remaining occupany criteria combinations, the transmit and receive state machines arbitrate according to round-robin scheduling based upon the state of the receive-last flag. (Block 65.) Thereafter, the arbitration process is repeated. (Return to Block 32.)

The arbitration arrangement described above provides dynamic scheduling between the state machines for priority access to a shared resource, i.e., the main memory coupled to the system bus, in a manner that minimizes buffer overflow and underflow, while preventing transmission starvation. In addition, the arbitration process may be utilized with an controller configured for either half-duplex or full-duplex operation on a local area network.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method for accessing a shared resource of a computer to enable bi-directional data flow through a controller connected between a subsystem and said shared resource, the subsystem configured to operate on a large packet of data and said shared resource configured to operate on a small burst of data, said method comprising the steps of:

receiving a packet of inbound data from the subsystem at a receive buffer of said controller;

transmitting a packet of outbound data to the subsystem from a transmit buffer of said controller;

assigning priority access to said shared resource to one of a receive request for initiating an inbound burst of data from said receive buffer to said shared resource and a transmit request for initiating an outbound burst of data from said shared resource to said transmit buffer in response to status inquiries of said controller; and accessing said shared resource in response to said step of assigning priority so as to initiate one of said inbound burst and said outbound burst, wherein the step of assigning priority comprises the steps of:

determining whether both transmission and reception are in progress;

determining whether the number of empty data byte locations in said receive buffer is not greater than a first threshold level;

determining whether the amount of data resident in said transmit buffer is greater than a second threshold level; and assigning priority to said transmit request for initiating said outbound burst from said shared resource to said transmit buffer;

whereby said method increases the efficiency of data flow through said controller by minimizing overflow of said receive buffer and underflow of said transmit buffer, and preventing transmission starvation.

2. The method of claim 1 wherein the step of assigning priority further comprises the steps of:

determining whether said requests are pending for initiating said inbound burst and said outbound burst; and if only one of said requests is pending, assigning priority access to the shared resource to said pending request;

asserting a receive-last flag if said pending request is a receive request; and deasserting said receive-last flag if said pending request is a transmit request.

3. The method of claim 2 wherein the step of assigning priority further comprises the step of, if both said receive request and said transmit request are pending:

determining whether said controller is configured for one of half-duplex communication and full-duplex communication with said subsystem.

4. The method of claim 3 wherein the step of assigning priority further comprises the steps of, if said controller is configured for half-duplex communication:

determining whether said step of transmitting is currently in progress; and if transmission is not in progress, assigning priority to said receive request for initiating said inbound burst from said receive buffer to said shared resource and asserting said receive-last flag if the packet of inbound data received from the subsystem is not complete.

5. The method of claim 4 wherein if the packet of inbound data received from the subsystem is complete, assigning priority to said transmit request for initiating said outbound burst from said shared resource to said transmit buffer and deasserting said receive-last flag.

6. The method of claim 3 wherein the step of assigning priority further comprises the step of, if transmission is not in progress and if reception is in progress:

assigning priority to said receive request for initiating said inbound burst from said receive buffer to said shared resource and asserting said receive-last flag if the packet of inbound data received from the subsystem is not complete.

7. The method of claim 6 wherein if the packet of inbound data received from the subsystem is complete, assigning priority to said transmit request for initiating said outbound burst from said shared resource to said transmit buffer and deasserting said receive-last flag.

8. The method of claim 3 wherein the step of assigning priority further comprises the step of, if both transmission and reception are not in progress:

arbitrating for access to said shared resource in accordance with round-robin scheduling between said transmit request and said receive request based upon the current state of said receive-last flag.

9. The method of claim 8 wherein round-robin scheduling comprises the step of alternating priority between said receive request and said transmit request.

10. The method of claim 3 wherein the step of assigning priority further comprises the step of, if transmission is in progress and if reception is not in progress:

assigning priority to said transmit request for initiating said outbound data burst from said shared resource to said transmit buffer and deasserting said receive-last flag if the packet of outbound data transmitted to the subsystem is not complete.

11. The method of claim 10 wherein if the packet of outbound data transmitted to the subsystem is complete, assigning priority to said receive request for initiating said inbound burst from said receive buffer to said shared resource and asserting said receive-last flag.

12. The method of claim 3 wherein the step of assigning priority further comprises the step of, if both transmission and reception are in progress:

arbitrating for access to said shared resource in response to current occupancy criteria of said transmit buffer and said receive buffer.

13. The method of claim 2 wherein the step of assigning priority further comprises the steps of, if said controller is configured for half-duplex communication:

determining whether said step of transmitting is currently in progress; and if transmission is currently in progress, arbitrating for access to said shared resource in response to current occupancy criteria of said transmit buffer and said receive buffer.

14. The method of claim 13 wherein the step of arbitrating comprises the steps of:

determining whether the number of empty data byte locations in said receive buffer is greater than said first threshold level; and if necessary, determining whether the amount of data resident in said transmit buffer is greater than said second threshold level.

15. The method of claim 14 wherein the step of arbitrating further comprises the step of, if the number of empty data byte locations in said receive buffer is not greater than said first threshold level and if the amount of data resident in said transmit buffer is greater than said second threshold level:

assigning priority to said receive request for initiating said inbound burst from said receive buffer to said shared resource and asserting said receive-last flag.

16. The method of claim 14 wherein the step of arbitrating further comprises the step of, if the number of empty data byte locations in said receive buffer is not greater than said first threshold level and the amount of data resident in said transmit buffer is not greater than said second threshold level:

assigning priority to said transmit request for initiating said outbound burst from said shared resource to said transmit buffer and deasserting said receive-last flag.

17. The method of claim 14 wherein the step of arbitrating further comprises the step of, if the number of empty data byte locations in said receive buffer is greater than said first threshold level:

assigning priority to said transmit request for initiating said outbound burst from said shared resource to said transmit buffer and deasserting said receive-last flag.

* * * * *